No. 640,889. Patented Jan. 9, 1900.
A. U. DUNBAR & S. E. MILLER.
TREE EXTRACTOR AND CARRIER.
(Application filed Aug. 13, 1897.)
(No Model.) 2 Sheets—Sheet 2.
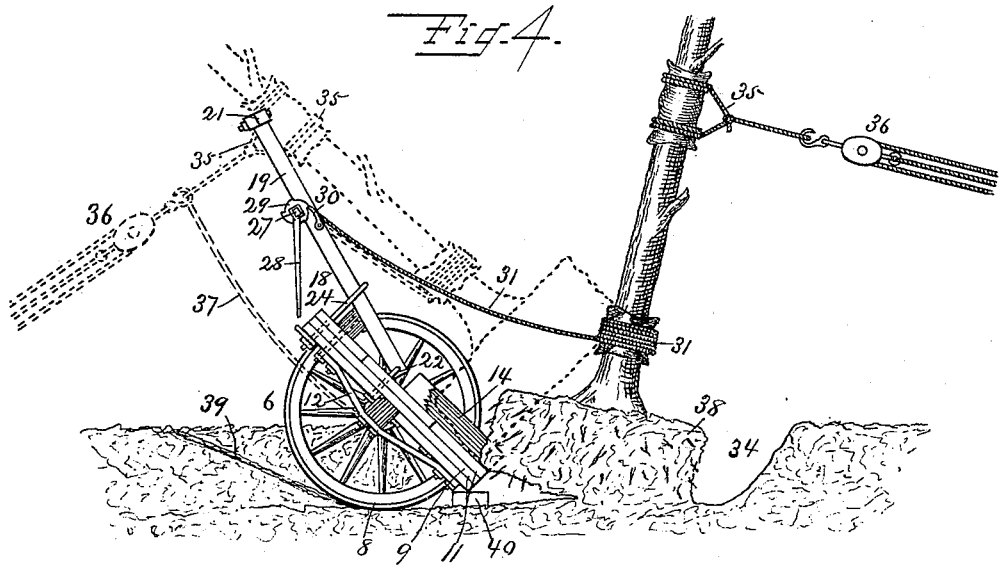
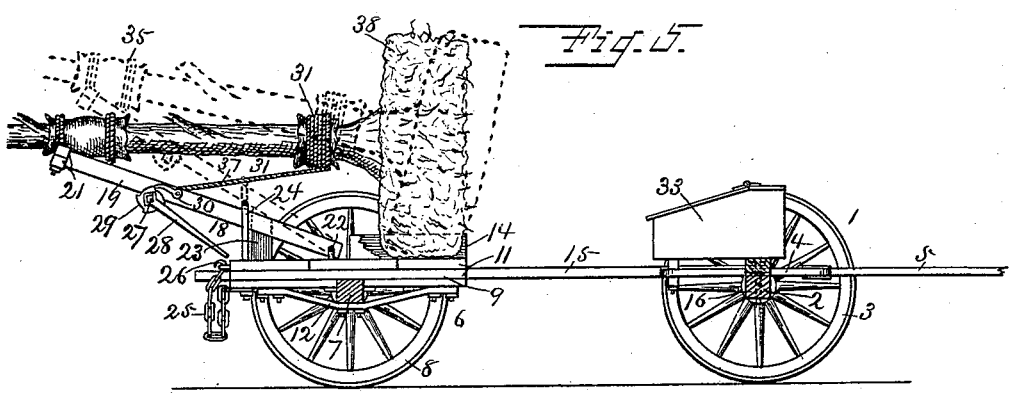
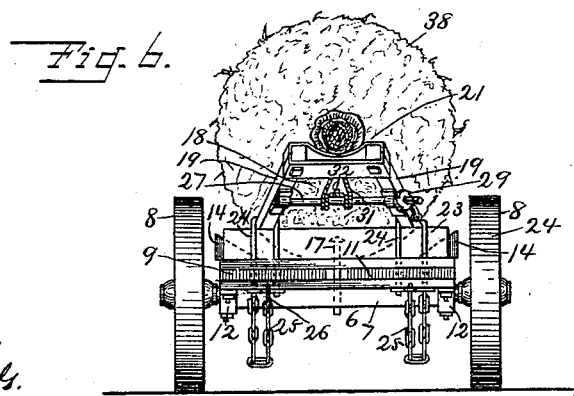
Witnesses:
P. R. Richards.
H. M. Richards.
Inventors:
A. U. Dunbar &
Saml. E. Miller,
By W. B. Richards,
Atty.
THE NORRIS PETERS CO., PHOTO-LITHO., WASHINGTON, D. C.

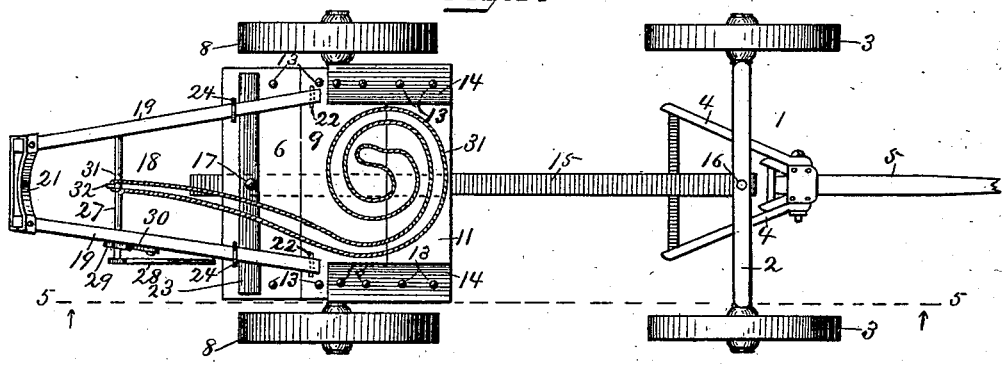

UNITED STATES PATENT OFFICE.

ARTHUR U. DUNBAR AND SAMUEL E. MILLER, OF GALESBURG, ILLINOIS.

TREE EXTRACTOR AND CARRIER.

SPECIFICATION forming part of Letters Patent No. 640,889, dated January 9, 1900.

Application filed August 13, 1897. Serial No. 648,097. (No model.)

*To all whom it may concern:*

Be it known that we, ARTHUR U. DUNBAR and SAMUEL E. MILLER, citizens of the United States, residing at Galesburg, in the county of Knox and State of Illinois, have invented certain new and useful Improvements in Tree Extractors and Carriers, of which the following is a specification.

The subject-matter of this invention is certain improvements in tree extractors and carriers of that type which are used in removing trees from the ground, loading them on the machine, carrying them, and transplanting them.

The leading objects of our invention are to provide improved means for removing trees from the ground and loading them onto the machine, to provide improved means for carrying the trees, and to provide improved means for transplanting them.

The novel means and novel combinations employed in carrying out the objects of our invention are hereinafter described and made the subject-matter of the claims hereto appended.

The preferred construction of parts, their assemblage, arrangement, and combination are illustrated in the accompanying drawings, in which—

Figure 1 is a top plan of our tree-carrier, showing the two trucks coupled together; Fig. 2, a side elevation of the rear truck and derrick which it carries in position for extracting a tree with a portion of ground and loading it thereon; Fig. 3, a side elevation of the parts shown at Fig. 2, showing the tree extracted with a portion of ground and partly loaded; Fig. 4, a side elevation showing a manner of loading differing, as hereinafter described, from the manner shown at Figs. 2 and 3; Fig. 5, a side elevation of the trucks coupled together and a tree loaded on the rear truck. This figure also shows a tool-chest on the forward truck. Fig. 6 is a rear elevation of the parts shown at Fig. 5, the tree-body shown in sectional elevation.

The forward truck 1, consisting in this instance of an ordinary axle 2, supported on wheels 3, hounds 4, and tongue 5, and the rear truck 6, consisting of an axle 7, supported on wheels 8, are parts of an ordinary wagon, and may be constructed in any desired or preferred manner. A platform 9 is mounted on the rear truck-axle, in this instance above the axle, but may be below it. The platform 9 in this instance is formed of planking 11, stayed by truss-braces 12 and bolts 13. A block or guard 14 is preferably fixed to each side of the platform 9, which blocks are beveled on their confronting sides. The platform 9 has a passage-way therethrough for the reach or coupling-pole 15, which is pivotally connected at its forward end with the forward truck 1 by the usual bolt 16 and is connected with the rear truck 6 by a bolt 17. The platform 9 is mounted on the rear truck in such manner that the coupling-pole when passed therethrough as shown and described and connected with the forward truck will retain or hold said platform in its normal position in a substantially horizontal or level position from its front to its rear end when the apparatus is standing on a substantially horizontal plane, or, in other words, will hold said platform in a plane parallel with said coupling-pole, as shown at Fig. 5.

The hinged and adjustable frame 18 is formed in this instance of two bars 19, preferably converging toward their upper ends, and connected at their upper ends by a saddle-bar 21, curved in its upper side part. The frame 18 is hinged or pivotally connected at its forward end with the platform 9 by means of staples 22, one of which is seated with its bent part in the lower and forward part of each bar 19, so that said frame can be raised and lowered at its rear end for the purpose of adjusting it at different angles of inclination to the platform 9, and is held after such adjustments by a block 23. The ends of the staples 22 are fixed in the platform 9. The block 23 is fixed in place by the bolt 17. The frame 18 is alined against lateral swing by means of long staples 24, one over each bar 19, and each of said staples is fixed in the platform 9. The platform 9 and frame 18 together constitute a derrick operating in loading a tree, as hereinafter described, and which derrick embodies as a material feature of our invention: (*a*) a platform mounted on the axle projecting forwardly of the wheels and substantially horizontal in its normal or tree-carrying position, (*b*) the same platform with a frame connected therewith, and (*c*) the same platform with an adjustable frame connected therewith.

At each side of the rear end of the platform 9 one end of a chain 25 is fixed, the other end of which carries a hook 26. A windlass 27 is journaled in the bars 19 and has an operating-handle 28 on one of its outer ends, and a ratchet 29 and pawl 30 for preventing backward rotation of the windlass. An endless cord 31 is looped over a stud-pin 32, Fig. 1, which projects from the windlass. At Fig. 6 a tool-chest 33 is shown mounted on the forward truck.

Preliminary to extracting and loading a tree a trench 34 is excavated about it. The rear truck, with the platform 9 and frame 18, is then removed from the coupling-pole 15 and forward truck. The frame 18, after withdrawal of the removable block 23, is turned down upon and to a position parallel with the rear end of the platform 9 and there secured by the chains 25, as shown at Figs. 2 and 3 by full lines. The rear truck, with the platform and frame 18, is then backed toward the tree until the wheels 8 are in the trench 34, when the truck and the platform and frame or derrick are turned upward and over against the body of the tree and into the inclined position shown at Fig. 2. The rope 31 is wound around and secured to the body of the tree near its roots and over a suitable packing, and the windlass 27 then turned to wind up the slack of the rope and draw sufficiently thereon to exert considerable lifting force on the tree. A rope 35, secured to the body of the tree, passes around the saddle 21 or upper end of the derrick, and a tackle 36, secured to the rope 35, is used to draw the derrick, truck, and tree over into the position shown by full lines at Fig. 3, and thereby elevate and extract the tree, with the ground or soil 38 which adheres to its roots, from the subjacent ground and load it, with the ball of ground 38, resting on the platform 9, as shown at same figure. While in this position the chains 25 are unhooked to release the bars 19 and permit of raising the frame 18 and tree into the respective positions shown by dot lines at Fig. 3 or, if desired, into other inclined positions, as may be required in balancing the load or holding shorter or longer limbs free of the surface of the ground. The frame 18 is held after such adjustments by means of the removable blocks 23 of the thickness desired. Draft-ropes 37 are connected with the truck 2 and the tackle 36, so that after the tree is in the position last described by further force applied by means of the tackle the truck and its load can be drawn up the inclines 39 and out of the trench 34, when the forward truck may be connected therewith, as shown at Fig. 5, by first tilting the rear truck into proper position for such purpose. The frame 18 when turned down upon the platform 9, as described, will, together with said platform, form a derrick for lifting and loading the tree onto the platform, as described.

At Fig. 4 we have shown another manner of loading a tree on our rear truck and derrick. In this case the tackle 36 is first applied, as shown by full lines, to incline the tree away from the truck and derrick. The truck and derrick are then placed in the position shown at same figure, with the forward end of the platform 9 resting slightly beneath the ball of ground 38 and preferably on a block 40. The tackle 36 is then applied to the opposite side of the tree and used to draw the tree and ball of ground over onto the derrick, as shown by dot lines at same figure. In this case the frame 18 may be adjusted at the proper angle before the tree is loaded thereon. The apparatus and tree are then removed from the trench, as hereinbefore described in connection with the other manner of loading described.

When loaded in either manner hereinbefore described, the ball of ground rests on a substantially horizontal platform 9, which is mounted on the rear truck and rests thereon so nearly over the axle of the rear truck as to balance or so nearly so that the coupling to the forward truck is easily made, as is also the uncoupling therefrom, and the truck, with its load, is easily handled when uncoupled from the forward truck. The ball of soil or ground 38 resting on the substantially horizontal platform when it (the platform) is uncoupled from the forward truck or coupled thereto will not have any tendency to slide therefrom, as is the case when it rests on an inclined platform or support, and the rear truck and derrick, with the horizontal platform, can be easily handled with great facility in unloading or transplanting trees by simply backing the apparatus into or near to a suitable excavation and then tilting it in an evident manner to locate the tree in an upright position. The horizontal platform 9 will also securely hold the ball of soil 38 from sliding forwardly with the tree when the frame 18 is adjusted in its higher positions at its rear end to support long limbs above the ground.

By the means described as the tree is extracted from the ground by the derrick the ball of soil and roots 38 is raised by and received upon the normally horizontal platform 9, where it rests without risk of sliding therefrom while coupling the forward and rear trucks together and in transporting to the place of resetting. By this means we avoid the necessity of a reach or coupling onto which the ball of soil 38 slides from an inclined plane or platform after the tree is loaded, as shown by the drawings in Letters Patent to H. P. Lentz, No. 389,089, of September 4, 1888. By the same means we also avoid the use of rope or chain lashings, as is required for retaining the ball of soil 38 on an inclined platform, and which lashings greatly damage the bark of the tree, especially in hauling the trees over rough ground or roads.

Having thus described our invention, what we claim as new, and desire to secure by Letters Patent, is—

1. In a tree extractor and carrier, and in combination, substantially as described, a truck, a platform supported on the axle thereof and projecting forwardly and rearwardly therefrom and constituting a support which carries the weight of the roots of the tree, and a frame mounted on said platform and projecting in rear thereof.

2. In a tree extractor and carrier, and in combination, substantially as described, a truck, a platform supported on the axle thereof and projecting forwardly therefrom substantially horizontal in its normal position and constituting a support which carries the weight of the roots of the tree, a frame hinged on said platform, and means for retaining said frame in inclined adjusted positions.

3. In a tree extractor and carrier, and in combination substantially as described, a truck, a platform mounted on said truck and projecting forwardly and rearwardly therefrom substantially horizontal in its normal loaded position as a support on which the roots of the tree rest, a frame hinged on said platform and adjustably connected therewith whereby one of its ends may be raised and lowered, and means for fixing said frame to said platform in its adjusted position.

4. In a tree extractor and carrier, and in combination, substantially as described, a truck, a platform mounted on said truck and projecting forwardly and rearwardly therefrom substantially horizontal in its normal loaded position as a support on which the roots of the tree rest, a frame adjustably connected with said platform whereby one of its ends may be raised and lowered, means for fixing said frame relatively to said platform, and a windlass and rope for connecting said frame with the lower part of the tree.

5. In a tree extractor and carrier, and in combination, substantially as described, a truck, a platform mounted on said truck to be substantially horizontal in its normal loaded position, a frame mounted on said platform and hinged thereto at one of its ends, guide-loops in which the side bars of said frame move up and down, and a block removably seated between said frame and said platform, whereby said frame can be adjusted in different angular relations to said platform by the use of blocks of different thicknesses.

6. In a tree extractor and carrier, and in combination, substantially as described, forward and rear trucks, a coupling-pole connecting said trucks, a platform mounted on the rear truck and projecting forwardly and rearwardly therefrom substantially horizontal in its normal loaded position as a support on which the roots of the tree rest, a frame mounted on said platform and projecting in rear thereof, whereby said frame and platform serve as a derrick in extracting the tree from the ground.

7. In a tree extractor and carrier, and in combination substantially as described, forward and rear trucks, a coupling-pole connecting said trucks, a platform mounted on the rear truck and projecting forwardly and rearwardly therefrom substantially horizontal in its normal loaded position as a support on which the roots of the tree rest, a frame adjustably mounted on said platform, means for fixing said frame relatively to said platform, a windlass mounted on said frame, a rope connecting said windlass with the lower part of the tree, and tackle, whereby said rear truck, platform and frame are drawn over as a derrick to extract a tree which is connected therewith.

8. In a tree extractor and carrier, and in combination, substantially as described, a truck, a platform supported on said truck and projecting forwardly and rearwardly of the axle thereof substantially horizontal in its normal loaded position and constituting a support on which the roots of the tree rest, a frame carried by said platform and projecting rearwardly therefrom, and a windlass and rope for connecting said frame with the lower part of the tree.

In testimony whereof we affix our signatures in presence of two witnesses.

ARTHUR U. DUNBAR.
SAMUEL E. MILLER.

Witnesses:
J. F. HAMILTON,
H. M. RICHARDS.